No. 886,209. PATENTED APR. 28, 1908.
G. E. HENRY.
EYE SHIELD.
APPLICATION FILED NOV. 18, 1907.
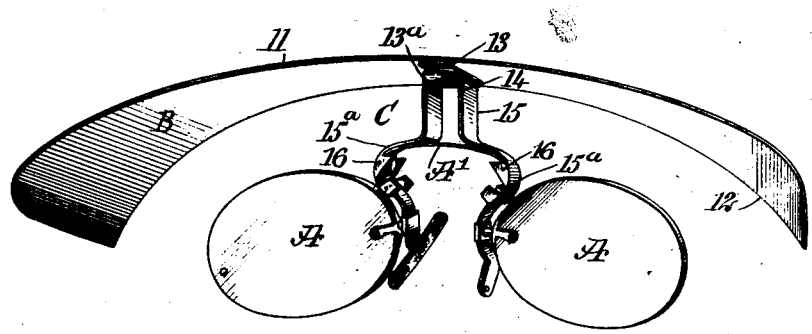
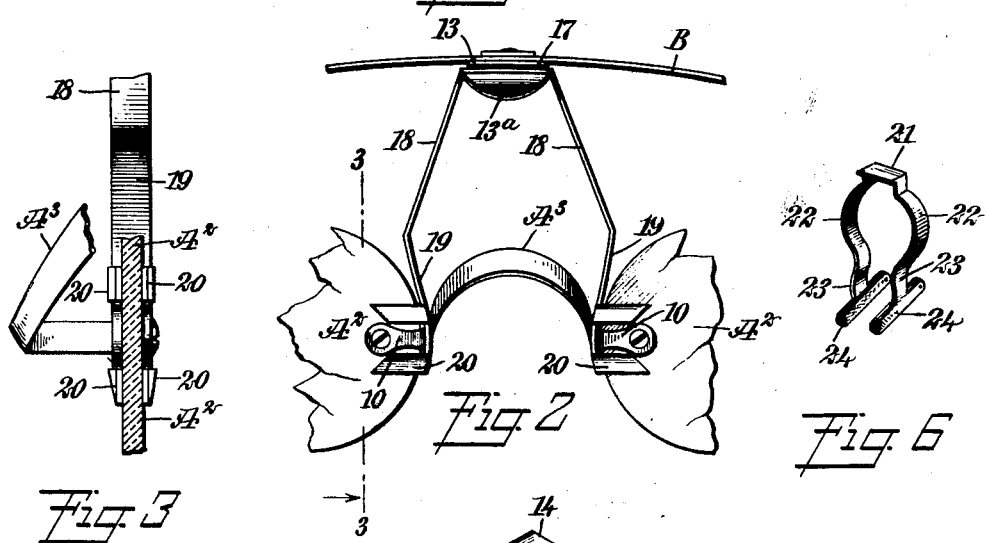
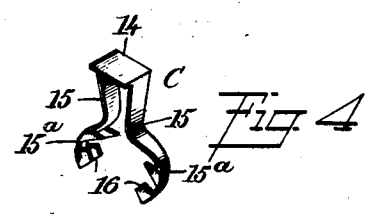
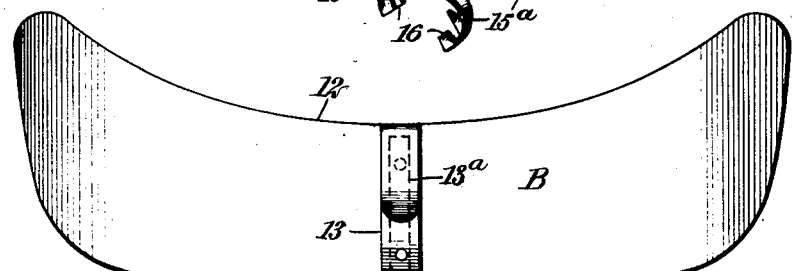
WITNESSES
INVENTOR
George E. Henry
BY
ATTORNEYS

UNITED STATES PATENT OFFICE.

GEORGE EDMOND HENRY, OF PHILADELPHIA, PENNSYLVANIA.

EYE-SHIELD.

No. 886,209.   Specification of Letters Patent.   Patented April 28, 1908.

Application filed November 18, 1907. Serial No. 402,641.

*To all whom it may concern:*

Be it known that I, GEORGE EDMOND HENRY, a citizen of the United States, and a resident of Philadelphia, in the county of Philadelphia and State of Pennsylvania, have invented a new and useful Improvement in Eye-Shields, of which the following is a full, clear, and exact description.

The purpose of the invention is to provide a light, effective eye shield adapted to be worn upon the nose in the same manner as an eyeglass, or which can be quickly and conveniently adjusted to the bow section of an eyeglass or the bridge of spectacles in such manner that the attachment can be readily removed when desired.

It is a further purpose of the invention to provide an attachment to eyeglasses or spectacles, that will comfortably support a shield above the lenses in such position as to protect the eyes from the rays of light in or out doors, and which in many instances will serve the purpose of smoked glasses.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a perspective view of an eyeglass and the improved shield applied thereto; Fig. 2 is a front elevation of the bridge section of a pair of spectacles and the applied attachment; Fig. 3 is a vertical section taken practically on the line 3—3 of Fig. 2; Fig. 4 is a detail perspective view of the shield support shown in Fig. 1; Fig. 5 is a bottom plan view of the detached shield; and Fig. 6 is a perspective view of the shield support adapted for direct clamping engagement with the nose of the wearer.

A represents the lenses of an eye-glass, A' the conventional connecting bow, and A² represents the lenses of a pair of spectacles, and A³ the bridge connecting said lenses, which bridge A³, as is customary, is provided with terminals at right angles to the lenses, the said terminals where they are connected with the lenses being designated by the numeral 10.

B represents the shield. This shield is made of light material, for example celluloid, and is suitably colored, and is particularly useful for preventing the direct rays of light from reaching the eyes. The shield is longitudinally bowed, its under face being concaved and its upper face convexed, and the rear longitudinal edge 12 of the said shield is concaved so as to fit comfortably to the forehead, while the forward edge 11 is more or less convexed, but I do not confine myself to any particular formation of shield. At the under central portion of the shield, an attaching device 13 is located, being secured transversely of the shield, and this attaching device is preferably in the form of a spring hook, as is illustrated, the bill 13ª of the hook facing forwardly.

The device C employed for supporting the shield B, and removably attaching it to the bow A', is illustrated in detail in Fig. 4. It consists of a top member 14 adapted to be slipped between the body and the bill of the said attaching device 13, and downwardly extending side members 15, that are preferably of less width than the upper horizontal member 14, and the said side members 15 at their lower ends are bowed or curved outwardly in opposite directions, as is shown at 15ª in said Fig. 4, and jaws 16 are provided at the lower end portions of the curved sections 15ª of the said supporting device C, which jaws are in the nature of lugs that extend inwardly from the side edges of the curved sections 15ª of the attachment, as is also clearly shown in Fig. 4.

In making the application of the attachment to eye-glasses, the curved portions 15ª of the support C, are carried over and made to conform to the outer faces of the bow A' at the top and at the sides, the spurs constituting the jaws 16 extending inward at the side edges of the lower or curved sections of the said bow A', as is clearly shown in Fig. 1. The shield is then attached to the support C by causing its attaching device 13 to receive the upper member 14 of the support.

The form of the support is slightly varied for attachment to spectacles, and this form of the support is shown in Figs. 2 and 3, wherein the support consists of an upper horizontal member 17 adapted to be received by the hook on the shield in the manner that has been described, and side members 18, that extend in opposite directions from the upper member 17, and are then carried downward slightly with a forwardly inclination, as is shown at 19 in the said Fig. 2, and at the lower ends of the sections 19 of the support shown in Fig. 2, outwardly extending jaws 20 are provided, which are also in the nature of spurs, and in making the application of the support to the spectacles, the jaws 20 are made to receive between them at each side of the support, the lenses A² where the said lenses connect with the bridge or nose piece A³, the members of the jaws extending above and below the terminals 10 of the said nose or bridge piece.

In Fig. 6 I have illustrated a support adapted to carry the shield B and to be applied directly to the nose. This form of support consists of an upper member 21, that corresponds to the members 14 and 17 in the construction hereinbefore described, and side members 22 that extend down from the upper member 21, which side members are curved outwardly in opposite directions at their upper portions, and are curved more or less inwardly at their lower portions or terminals, as is illustrated at 23 in said Fig. 6, and nose clamps 24 of any suitable or approved construction, are either made integral with the terminal portions of the support shown in Fig. 6, or are attached thereto, so that when the said support shown in Fig. 6 is attached to the shield B, by forcing the support over the bridge of the nose it will be retained in position in like manner as eyeglasses.

Having thus described my invention, I claim as new and desire to secure by Letters Patent,—

1. A shield for the eyes having an attaching device secured to its lower face and comprising a spring member, and means for supporting the said shield upon the nose of the wearer, the said means comprising a support having a member for engagement with the spring member of the attaching device, to removably hold the support in connection with the shield.

2. A shield for the eyes having an attaching device on its under face, and means for supporting the said shield upon the nose of the wearer, the said means comprising a spring support having a top member removably connected with the attaching device, and side members extending from the top member and provided at their ends with jaws.

3. A shield for the eyes comprising a support consisting of a spring material bent upon itself to form an upper member and side members, the side members terminating in jaws, and a shield adapted to be carried by said support, which shield is provided with a spring connecting member at its lower portion adapted for removable engagement with the upper member of the support.

4. The combination with a shield for the eyes, provided on its under central portion with a spring attaching device, of a spring support for the shield provided with jaws, the said support being constructed to engage said attaching device on the shield.

5. The combination with a shield for the eyes, of an attaching device comprising a spring hook secured to the under face of the shield and having its bill facing forwardly, and a spring support for the shield adapted to removably secure it in position, the said support having a top member adapted to be slipped between the body and bill of the hook, and side members extending downward from the top member and provided at their lower ends with jaws.

6. The combination with a pair of lenses for the eyes, and the connecting piece, of a support removably connected with said connecting piece and extending upwardly therefrom, said support consisting of a spring material bent upon itself to form an upper member and side members, the side members terminating in jaws for the reception of the said connecting piece, and a shield adapted to be carried by said support, which shield is provided with a spring connecting member at its lower portion adapted for removable engagement with the upper member of the support.

7. The combination with a pair of lenses for the eyes, and the connecting piece, of a spring supporting device having side members adapted to be removably connected with said connecting piece, and a top member connecting the side members, and a shield having a spring attaching device secured thereto, and adapted to receive the said top member of the spring supporting device, the said shield being located over the said lenses.

8. The combination with a shield for the eyes, of means for supporting the said shield above the eyes, the said means including a spring attaching device secured to the shield, and a spring supporting device having a member adapted for removable engagement with the said attaching device.

In testimony whereof I have signed my name to this specification in the presence of two subscribing witnesses.

GEORGE EDMOND HENRY.

Witnesses:
  T. H. REED,
  J. J. MALLOY.